United States Patent
Ishikawa et al.

(10) Patent No.: US 6,239,757 B1
(45) Date of Patent: *May 29, 2001

(54) COMMUNICATION MODULE FOR A MEANS OF TRANSPORTATION

(75) Inventors: Youhei Ishikawa; Toru Tanizaki, both of Nagaokakyo (JP)

(73) Assignee: Murata Manufacturing Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/837,836

(22) Filed: Apr. 22, 1997

Related U.S. Application Data

(63) Continuation of application No. 08/698,218, filed on Aug. 14, 1996, now abandoned, which is a continuation of application No. 08/417,650, filed on Apr. 5, 1995, now abandoned.

(30) Foreign Application Priority Data

Apr. 7, 1994 (JP) .................................................. 6-069158

(51) Int. Cl.⁷ .................................................. H01Q 1/32
(52) U.S. Cl. .......................... 343/711; 343/767; 343/771
(58) Field of Search .................................. 343/711, 770, 343/771, 776, 767, 700 MS, 713, 789; H01Q 13/10, 13/20, 1/32

(56) References Cited

U.S. PATENT DOCUMENTS

| | | | |
|---|---|---|---|
| 3,530,478 | * 9/1970 | Corzine et al. | 343/771 |
| 4,468,673 | * 8/1984 | Stern et al. | 343/770 X |
| 4,618,865 | * 10/1986 | Lamensdorf et al. | 343/776 |
| 4,742,354 | 5/1988 | Wen et al. | 342/188 |
| 5,177,494 | * 1/1993 | Dorrie et al. | 343/711 |
| 5,416,492 | * 5/1995 | Takahashi et al. | 343/771 |
| 5,422,652 | * 6/1995 | Caer et al. | 343/771 |
| 5,757,331 | * 5/1998 | Yoneyama et al. | 343/771 |

FOREIGN PATENT DOCUMENTS 618642  10/1994  (EP) .

OTHER PUBLICATIONS

K. Maamria, et al., Leaky NRD Guide as a Feeder for Microwave Planar Antennas, *IEEE Transactions on Antennas and Propagation*, vol. 41, No. 12, pp. 1680–1686, Dec. 1993.

(List continued on next page.)

*Primary Examiner*—Hoanganh Le
*Assistant Examiner*—Tho Phan
(74) *Attorney, Agent, or Firm*—Ostrolenk, Faber, Gerb & Soffen, LLP

(57) ABSTRACT

A communication module for a vehicle including an automobile, a vessel or the like, the communication module being disposed on a back side or inside of an identification plate of the means of transportation. The communication module is formed of a millimeter wave integrated circuit section and a plane antenna section. The millimeter wave integrated circuit section has two conductive plates arranged in parallel with each other, and a dielectric stripline and an electric element disposed between the conductive plates. The plane antenna section has two conductive plates arranged in parallel with each other, a dielectric stripline disposed between the conductive plates and a slot made in one of the conductive plates. At least a respective one of the conductive plates of the millimeter wave integrated circuit section and a respective one of the conductive plates of the plane antenna section are integrated in a plane. The identification plate is made of a material which transmits a millimeter wave with a small loss, for example, polycarbonate, polybutylene terephthalate, polypropylene reinforced with glass fiber, ABS resin or the like.

56 Claims, 6 Drawing Sheets

OTHER PUBLICATIONS

Sterzer, An Electronic License Plate for Motor Vehicles, *RCA Review*, vol. 35, Jun. 1974, pp. 167–175.

Colquhoun, et al., MMICS For Automotive and Traffic Applications, *IEEE GaAs Integrated Circuit Symposium—Technical Digest 1992*, Oct. 7, 1992.

"Leaky NRD–Guide Fed Planar Antenna Based on Asymmetric Housing" by Takeshi Kato and Tsukasa Yoneyama, Pamphlet of Mass Meeting of Institute of Electronics, Information and Communication held in Spring, 1993, and Translation.

* cited by examiner

COMMUNICATION MODULE FOR A MEANS OF TRANSPORTATION

This is a Continuation of application Ser. No. 08/698,218, filed on Aug. 14, 1996, abandoned, which is a Continuation of application Ser. No. 08/417,650, filed on Apr. 5, 1995, abandoned.

BACKGROUND OF THE INVENTION

1. Field of the Invention

The present invention relates to a communication module for a means of transportation, and more particularly to a communication module which is used for measurement of the distance and/or the relative speed between a means of transportation such as an automobile, a vessel or the like and another means of transportation ahead or behind, or for communication between means of transportation.

2. Description of Related Art

Now, an automobile is given as an example of means of transportation. A communication module is provided in the front or the rear side of an automobile in order to measure the distance and the relative speed between the automobile and another automobile ahead or behind. The communication module comprises a Gunn oscillator, a circulator, a directional coupler, a mixer and an antenna. For a high performance communication system, an antenna which has a high directivity and a large gain, that is, an antenna with large dimensions is required to reduce the S/N ratio (signal-to-noise ratio) and the C/N ratio (carrier-to-noise ratio). Accordingly, the communication module occupies a large area of the front or the rear side of an automobile, which ruins the appearance of the automobile.

SUMMARY OF THE INVENTION

An object of the present invention is to provide a thin communication module for a means of transportation which causes substantially no changes in the appearance of the means of transportation.

In order to attain the object, a communication module for a means of transportation comprises: a millimeter wave integrated circuit section comprising two conductive plates arranged parallel with each other, and a dielectric stripline and an electric element disposed between the conductive plates; and a plane antenna section comprising two conductive plates arranged parallel with each other, a dielectric stripline disposed between the conductive plates, and a slot made in one of the conductive plates; and the millimeter wave integrated circuit section and the plane antenna section are disposed on a back side or inside of an identification plate of the means of transportation such that at least respective one of the conductive plates of the millimeter wave integrated circuit section and the conductive plates of the plane antenna section are integrated in a plane, the identification plate transmitting a millimeter wave with a small loss.

The identification plate is made of polycarbonate, polybutylene terephthalate, polypropylene reinforced with glass fiber, ABS resin or the like.

When the communication module which is disposed on the front side or the rear side of a means of transportation is used as a radar, a millimeter wave propagated from the millimeter wave integrated circuit section is emitted from the plane antenna section and passes through the identification plate. When the millimeter wave reaches another means of transportation ahead or behind, the millimeter wave is reflected by the means of transportation and comes back to the identification plate. Then, the reflected millimeter wave passes through the identification plate and enters the plane antenna section.

The communication module also can be used as a means of communication. In sending information, the information is converted into a millimeter wave in the millimeter wave integrated circuit section, and the millimeter wave is emitted from the plane antenna section. The millimeter wave passes through the identification plate and is received by an antenna section of a communication module mounted on another means of transportation ahead or behind. In receiving information, a millimeter wave emitted from an antenna section of another means of transportation ahead or behind passes through the identification plate and is received by the plane antenna section. The communication module may be a type which either sends or receives information as well as a type which both sends and receives information.

Since at least a respective one of the conductive plates of the millimeter wave integrated circuit section and a respective one of the conductive plates of the plane antenna section maybe integrated in a plane, the communication module can be assembled as a thin type. Further, the communication module is disposed on a back side or inside of an identification plate of a means of transportation and hardly shows on the surface of the means of transportation.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENT

An embodiment of the present invention is described with reference to the accompanying drawings. The embodiment is a radar head which is mounted on an automobile to measure the distance and the relative speed between the automobile and another automobile ahead or behind.

Figure 1:
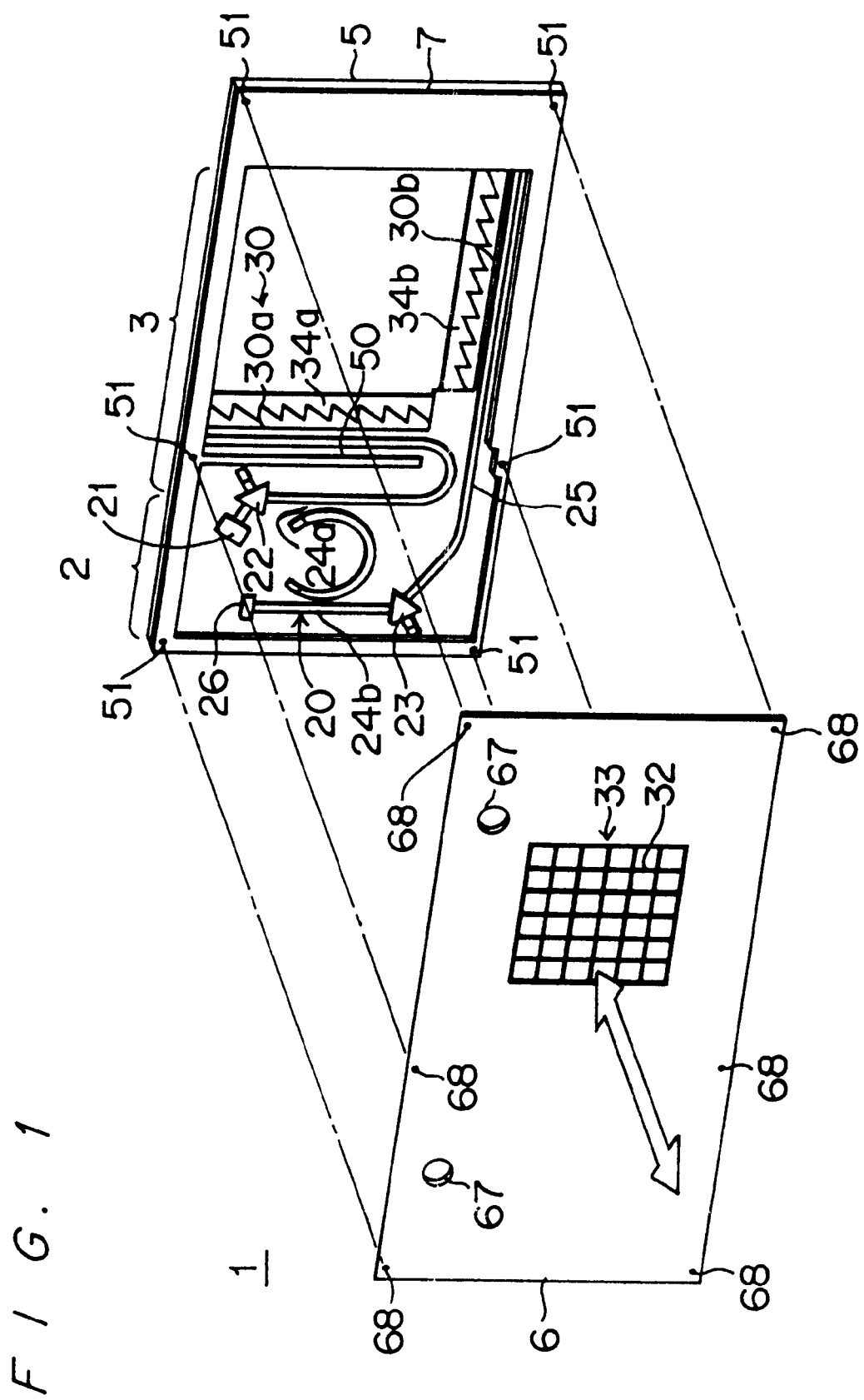
FIG. 1 is an exploded perspective view of a communication module for a means of transportation which is an embodiment of the present invention.
Figure 2:
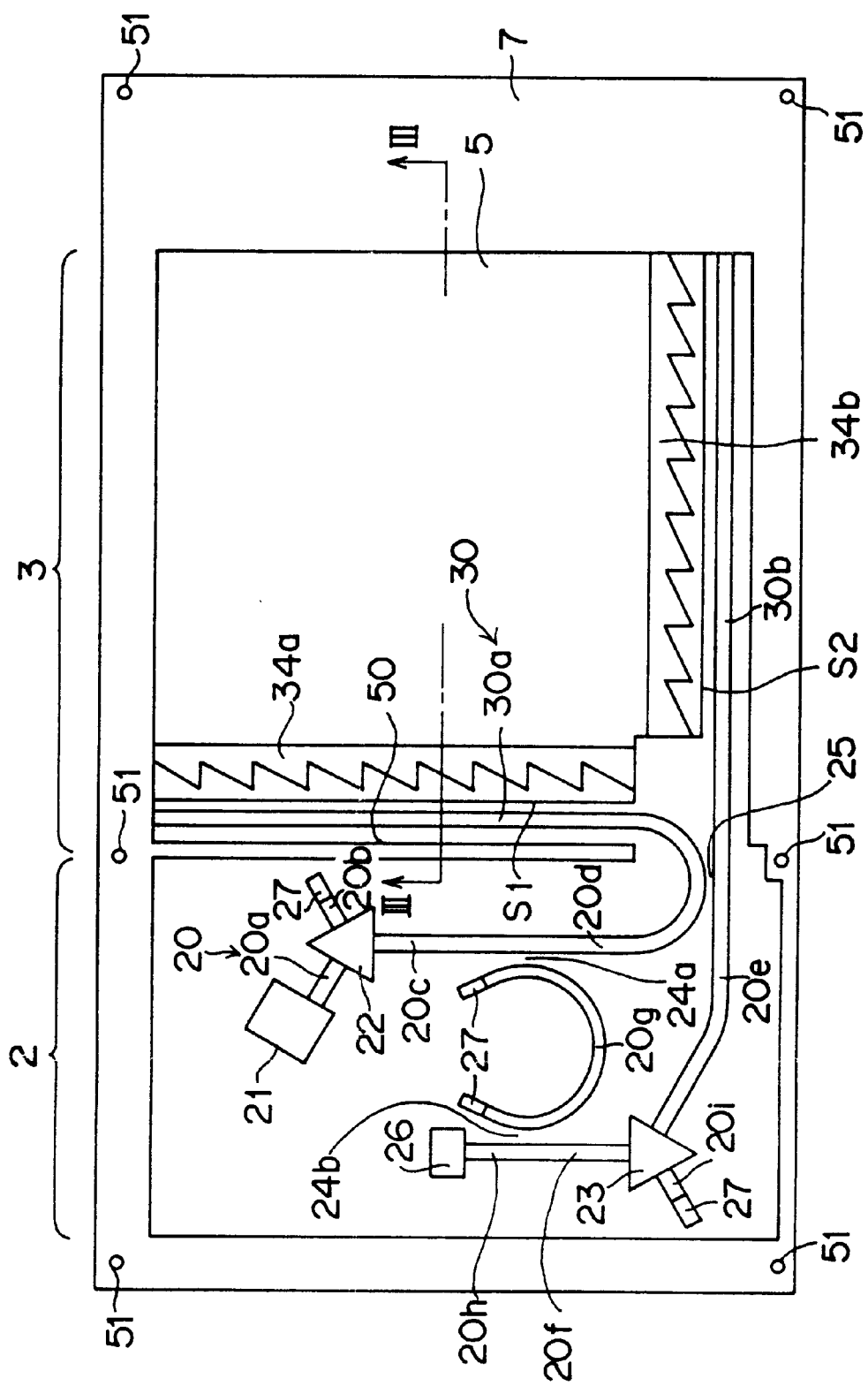
FIG. 2 is an enlarged internal plan view of a millimeter wave integrated circuit section and a plane antenna section.

FIGS. 1 and 2 show the structure of a radar head 1 to be mounted on an automobile. The radar head 1 is rectangular and comprises a millimeter wave integrated circuit section 2 and a plane antenna section 3. The millimeter wave integrated circuit section 2 comprises a nonradiative dielectric waveguide (hereinafter referred to as NRD waveguide) 20 and a group of NRD waveguide electric elements, namely, an FM modulating Gunn oscillator 21, circulators 22 and 23, directional couplers 24a, 24b and 25, a mixer 26 and nonreflective terminals 27.

The NRD waveguide 20 is mainly composed of a conductive base plate 5, dielectric striplines 20a, 20b, 20c, 20d, 20e, 20f, 20g, 20h and 20i, and a conductive plate 6. The dielectric striplines 20a through 20i are made of a material with a small loss, for example, fluororesin, polyethylene resin, polystyrene resin or the like. The conductive base plate 5 and the conductive plate 6 have tapped holes 51 and 68, respectively. The conductive base plate 5 and the conductive plate 6 are Joined on a parallel with each other by putting a screw into the holes 51 and 68 with a spacer 7 inbetween. Then, the dielectric striplines 20a through 20i and the NRD waveguide electric elements 21 through 27 are inserted between the plates 5 and 6.

The FM modulating Gunn oscillator 21 is connected to the circulator 22 via the dielectric stripline 20a, and the circulator 22 is connected to the terminal 27 via the dielectric stripline 20b. The circulator 22 is also connected to the directional coupler 24a via the dielectric stripline 20c. Because of the directional coupler 24a, a signal generated from the Gunn oscillator 21 diverges in two ways. The directional coupler 24a is connected to the directional coupler 25 via the dielectric stripline 20d and connected to the directional coupler 24b via the dielectric stripline 20g. The directional coupler 25 is connected to a dielectric stripline 30a of the plane antenna section 3. The directional coupler 24b is connected to the circulator 23 via the dielectric stripline 20f and connected to the mixer 26 via the dielectric stripline 20h. The circulator 23 is connected to a dielectric stripline 30b of the plane antenna section 3 via the dielectric stripline 20e. The circulator 23 is also connected to a nonreflective terminal 27 via the dielectric stripline 20i.

Lead wires extend from the FM modulating Gunn oscillator 21 and the mixer 26, respectively, and pierce through the conductive base plate 5. Accordingly, the ends of the lead wires are lead out on the reverse side of the conductive base plate 5 and are connected to, for example, a signal processing section provided in the body of an automobile. A frequency control signal which drives the FM modulating Gunn oscillator 21 and an intermediate frequency signal which is outputted from the mixer 26 are transmitted via the respective lead wires. The FM modulating Gunn oscillator 21, the circulators 22 and 23, the directional couplers 24a, 24b and 25, the mixer 26 and the nonreflective terminals 27 are conventional, and the detailed description of these elements is omitted.

The plane antenna section 3, which is composed of an NRD waveguide 30 and a slot antenna 33, is separated from the millimeter wave integrated circuit section 2 by a partition conductor 50 which is provided to the spacer 7. The NRD waveguide 30 is mainly composed of the conductive base plate 5, dielectric striplines 30a and 30b, and the conductive plate 6. The NRD waveguide 20 of the millimeter wave integrated circuit section 2 and the NRD waveguide 30 of the plane antenna section 3 commonly use the conductive base plate 5 and the conductive plate 6. The dielectric striplines 30a and 30b are inserted between the plates 5 and 6. The dielectric striplines 30a and 30b are made of a material with a small loss, for example, fluororesin, polyethylene resin, polystyrene resin or the like.

Figure 3:
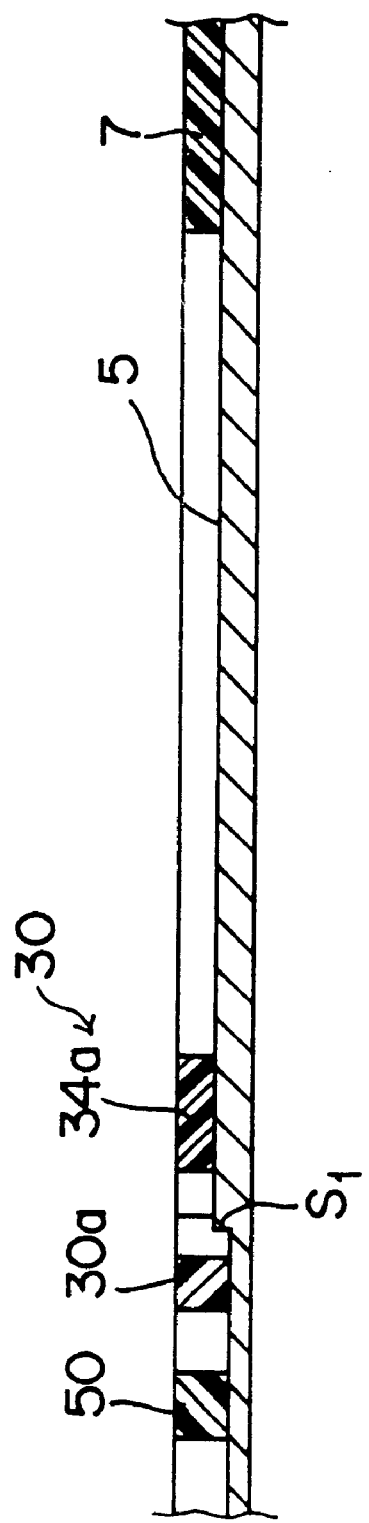
FIG. 3 is a sectional view of the plane antenna section, taken along the line III—III of FIG. 2.

The conductive base plate 5 has steps S1 and S2 in positions which are at specified distances from the dielectric striplines 30a and 30b and have relatively large electric field strengths generated by millimeter waves propagated by the dielectric striplines 30a and 30b, respectively (see FIG. 3). Thus, the portion of the conductive base plate 5 which is opposite the slot antenna 33 has a larger thickness. With this arrangement, the millimeter waves propagated by the dielectric striplines 30a and 30b leak and radiate, thereby improving the impedance matching of the plane antenna section 3. Consequently, the plane antenna section 3 obtains a high radiation efficiency in a wide band.

Further, dielectric prisms 34a and 34b are provided near the dielectric striplines 30a and 30b to deflect the millimeter waves in directions perpendicular to the extending directions of the dielectric striplines 30a and 30b, respectively (see FIG. 3). The dielectric prisms 34a and 34b are made of a dielectric material, for example, fluororesin. Each of the dielectric prisms 34a and 34b has a saw-tooth or chopping surface on the side facing the corresponding dielectric stripline 30a or 30b and has a flat surface extending parallel with the corresponding dielectric stripline 30a or 30b on the opposite side.

Figure 4:
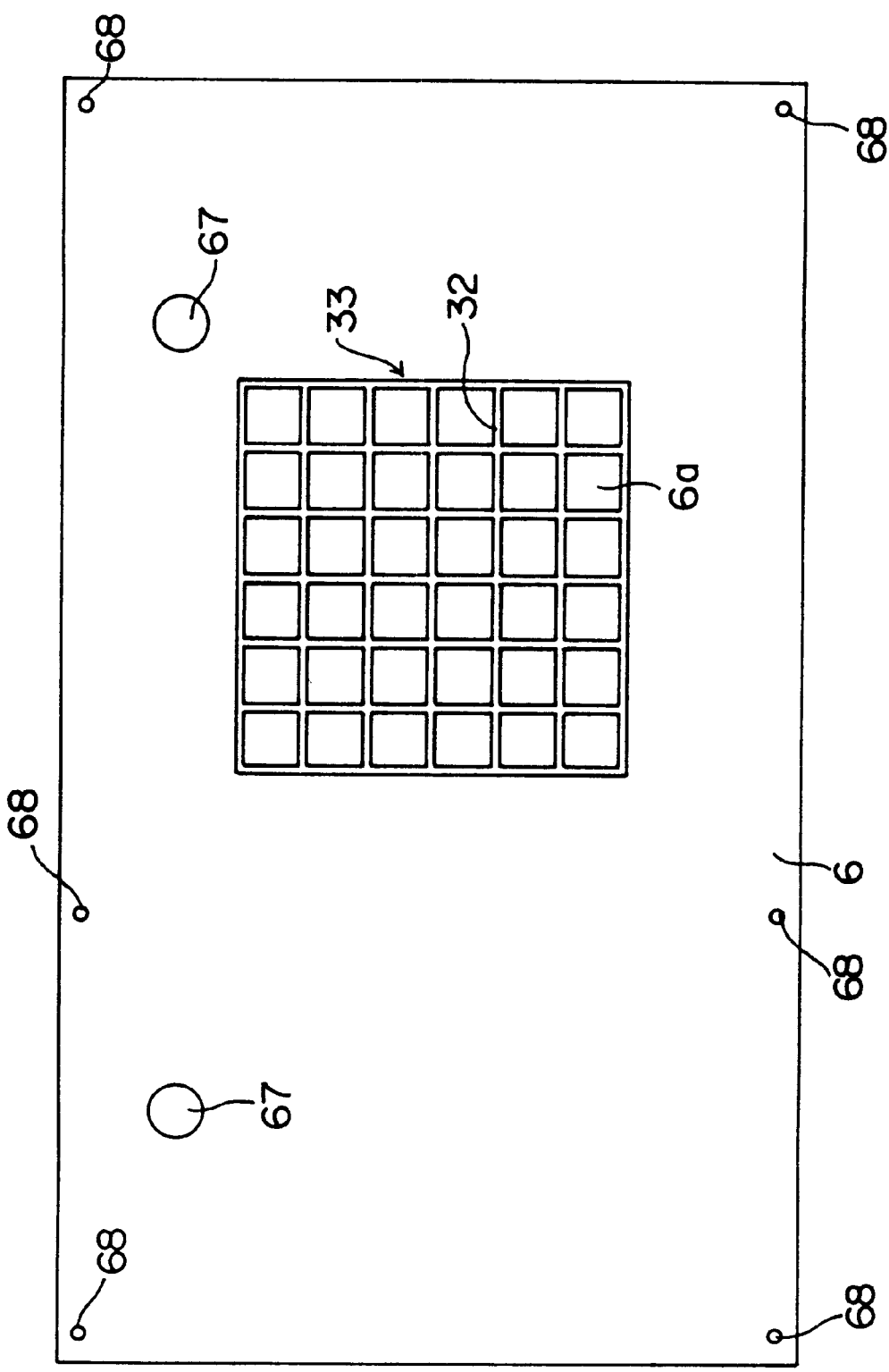
FIG. 4 is an enlarged plan view of a conductive plate used in the communication module of FIG. 1.

As shown in FIG. 4, the conductive plate 6 has latticed slots 32, and the lattice portion works as the slot antenna 33. Small conductive pieces 6a separated from the conductive plate 6 by making the latticed slots 32 are stuck on a prevention film (not shown), and the prevention film is put on the conductive plate 6 such that the pieces 6a are held in the lattice portion. This prevention film is made of a material which can transmit the millimeter wave with only a small loss.

The radar head 1 of the above structure has a very small dimension in the millimeter wave radiating direction and large dimensions in the directions perpendicular to the millimeter wave radiating direction. Thus, the radar head 1 is a thin type but has a large radiation area.

Next, the action of the radar head 1 is described.

In the radar head 1, the NRD waveguide 20 of the millimeter wave integrated circuit section 2 matches the NRD waveguide 30 of the plane antenna section 3 electrically and mechanically. A millimeter wave emitted from the FM modulating Gunn oscillator 21 is propagated through the dielectric stripline 20a, the circulator 22, the dielectric stripline 20c, the directional coupler 24a, the dielectric stripline 20d in order and is led to the directional coupler 25. Then, the millimeter wave diverges in two ways to the dielectric stripline 30a and to the dielectric stripline 30b. The millimeter wave guided to the dielectric stripline 30a and the millimeter wave guided to the dielectric stripline 30b have a phase difference of 90 degrees.

The millimeter wave guided to the dielectric stripline 30a leaks and radiates because of the step S1. Then, the millimeter wave is deflected by the dielectric prism 34a in a direction perpendicular to the extending direction of the dielectric stripline 30a and enters the slot antenna 33 made in the conductive plate 6. In the meantime, the millimeter wave guided to the dielectric stripline 30b leaks and radiates because of the step S2. Then, the millimeter wave is deflected by the dielectric prism 34b in a direction perpendicular to the extending direction of the dielectric stripline 30b and enters the slot antenna 33. These millimeter waves are combined. Since these millimeter waves which enter the slot antenna 33 have a mutual phase difference of 90 degrees, a clockwise or counterclockwise circularly polarized wave is emitted from the slots 32 of the antenna 33.

If automobiles have such radar heads, which emit circularly polarized waves with the same plane of polarization, respectively, a millimeter wave which is emitted from an automobile and reflected by an automobile ahead or behind and a millimeter wave which is emitted from an oncoming automobile are circularly polarized in mutually opposite directions. Therefore, it is possible for only the millimeter wave which is reflected by the automobile ahead or behind to be selectively received by the automobile, and magnetic interference of the millimeter wave which is emitted from the oncoming automobile can be prevented.

The millimeter wave reflected by the automobile ahead or behind is received by the radar head 1 in the following way. The millimeter wave enters the plane antenna section 3 through the slots 32 of the slot antenna 33 and is received by the dielectric striplines 30*a* and 30*b*. Then, the millimeter wave is guided to the millimeter wave integrated circuit section 2 and propagated to the directional coupler 25, the dielectric stripline 20*e*, the circulator 23, the dielectric stripline 20*f* and the directional coupler 24*b* in order. The millimeter wave emitted from the FM modulating Gunn oscillator 21 is partly propagated to the directional coupler 24*b* via the directional coupler 24*a* and the dielectric stripline 20*g*. This millimeter wave emitted from the FM modulating Gunn oscillator 21 and the millimeter wave received by the antenna section 3 are propagated to the mixer 26 and mixed therein, and accordingly, an intermediate frequency signal is generated.

Next, mounting of the radar head 1 onto an automobile is described.

Figure 5:
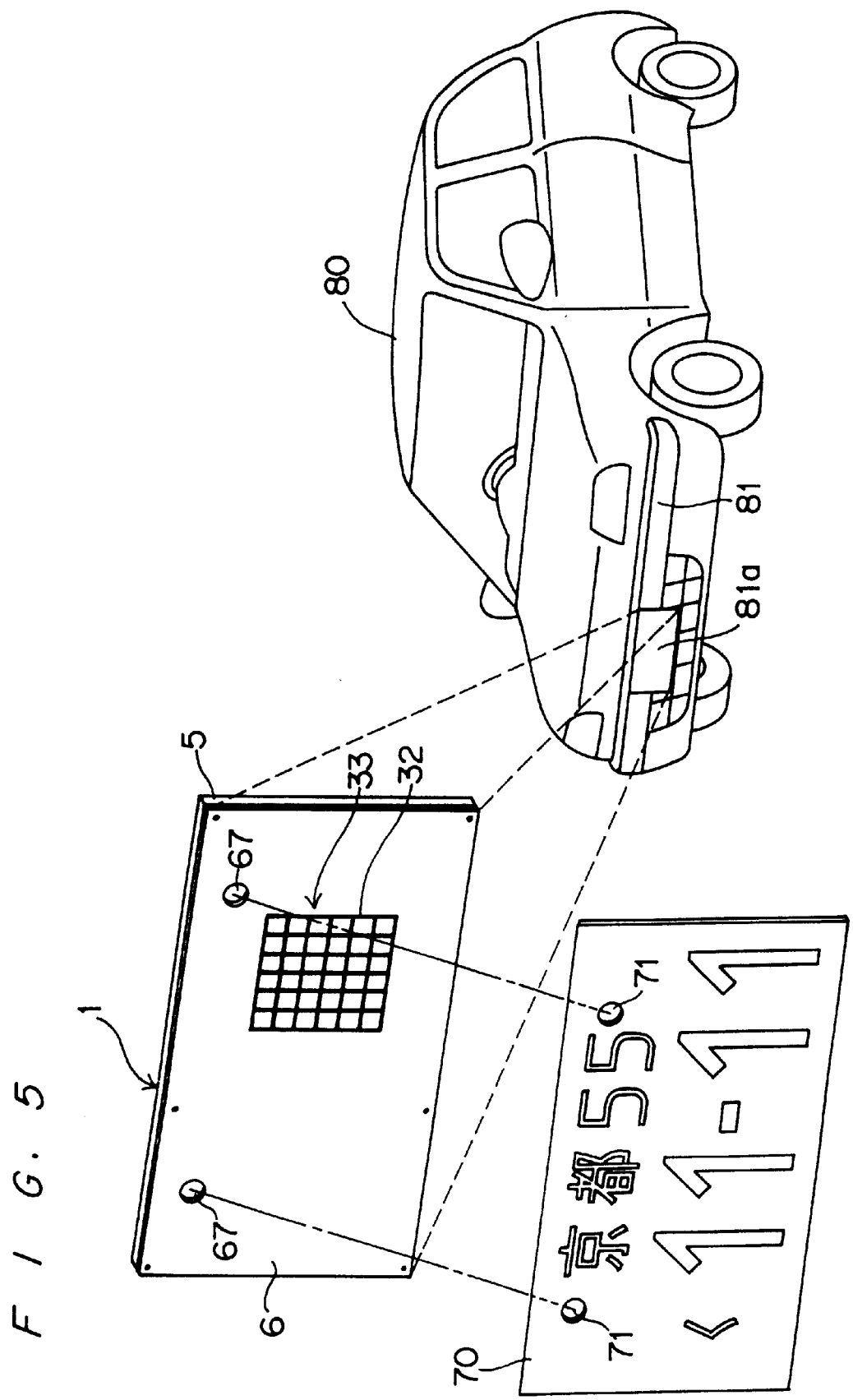
FIG. 5 is a perspective view of an automobile which is provided with the communication module of FIG. 1.

As shown in FIG. 5, the radar head 1 is fitted in a license plate fitting portion 81*a* of a front bumper 81 of an automobile 80 such that the slot antenna 33 faces forward. Then, a license plate 70 is fixed on the radar head 1 by inserting and tightening screws in holes 67 made in the conductive plate 6 and holes 71 made in the license plate 70. At that time, the radar head 1 is positioned such that the slot antenna 33 is vertically set and that the radar head 1 is inside the area of the license plate 70. Thus, the radar head 1 is set behind the license plate 70 and hardly changes the appearance of the automobile 80.

The license plate 70 is made of a material which can transmit a millimeter wave with a small loss. For example, polycarbonate, polybutylene terephthalate, polypropylene reinforced with glass fiber, ABS resin or the like is used as the material of the license plate 70.

Figure 6:
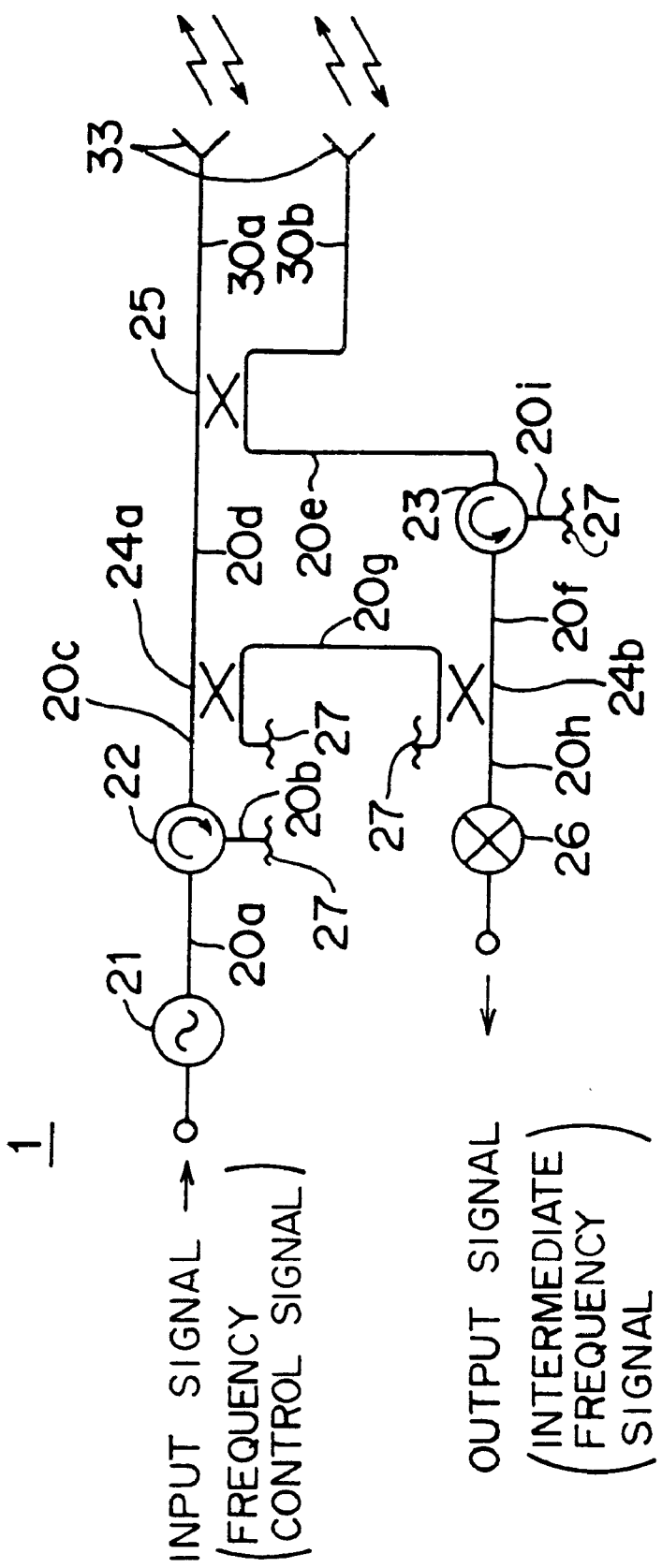
FIG. 6 is an equivalent electric circuit diagram of the communication module of FIG. 1.

FIG. 6 shows the equivalent electric circuit of the radar head 1. Referring to FIG. 6, the action of the radar head 1 mounted on the automobile 80 is described.

A millimeter wave is emitted from the FM modulating Gunn oscillator 21 by order of the frequency control signal. The millimeter wave is propagated through the circulator 22, the directional coupler 24*a*, the directional coupler 25, the dielectric striplines 30*a* and 30*b*, and is radiated forward from the slots 32 of the slot antenna 33. The radiated millimeter wave passes through the license plate 70 and reaches an automobile ahead. Then, the millimeter wave is reflected by the automobile and comes back to the license plate 70. The reflected millimeter wave passes through the license plate 70 and enters the plane antenna section 3 through the slots 32. Then, the millimeter wave is received by the dielectric striplines 30*a* and 30*b* and propagated to the mixer 26 through the directional coupler 25 and the circulator 23. The mixer 26 generates an intermediate frequency signal in accordance with the millimeter wave, and the intermediate frequency signal is sent to a signal processing section of the automobile 80. In the signal processing section, the distance of the automobile 80 from the automobile ahead, etc. are calculated from the intermediate frequency signal, and the result is indicated on a liquid crystal display or the like provided in the automobile 80.

As described above, the radar head 1 has a structure wherein the conductive plates 5 and 6 are arranged parallel with each other, and the dielectric striplines 20*a* through 20*i*, 30*a* and 30*b* which are provided between the conductive plates 5 and 6 form the NRD waveguide 20 of the millimeter integrated circuit section 2 and the NRD waveguide 30 of the plane antenna section 3. Therefore, the millimeter integrated circuit section 2 matches the plane antenna section 3 well, and the radar head 1 can be assembled as a thin type.

Further, since the radar head 1 has a simple configuration and a simple structure, the radar head 1 is high in productivity and low in cost.

Moreover, since the dielectric prisms 34*a* and 34*b* deflect leaking and radiating millimeter waves, the radar head 1 can emit a millimeter wave with a substantially even electric field distribution and with substantially no residual power.

Although the embodiment is a communication module employed in an automobile, the embodiment can be employed in a vessel or any other means of transportation.

The positional relationship between the millimeter integrated circuit section and the plane antenna section, and the sizes of these sections can be determined optionally according to the specification.

Although in the embodiment, both the conductive plates 5 and 6 are jointless, it is possible to, use, instead of one of the jointless conductive plates 5 and 6, a conductive plate having two separate pieces for the millimeter integrated circuit section and the plane antenna section.

It is possible either to incorporate the communication module in the license plate or to assemble the communication module and the license plate in the same process. Also, the communication module can be fitted to the rear license plate.

Such a communication module for a means of transportation is ordinarily coated with a dielectric protector and thereby is protected from rain, snow, ice, etc. The dielectric protector, that is, an antenna radome, can be modified to serve as a license plate. More specifically, numbers and letters are formed on the surface of the antenna radome by printing, pressing or the like. The antenna radome is required to be thin and weatherproof, and the antenna radome is made of polycarbonate, polybutlene terephthalate, polypropylene reinforced with glass fiber, ABS resin or the like.

The communication module functions not only as a radar as described above but also as a means of communication between means of transportation.

Although the present invention has been described in connection with the preferred embodiment, it is to be noted that various changes and modifications are possible to those who are skilled in the art. Such changes and modifications are to be understood as being within the scope of the present invention.

What is claimed is:

1. A radiating system for a vehicle comprising:
   a) a first conductive plate and a second conductive plate arranged substantially parallel to each other at a predetermined distance;
   b) a millimeter wave integrated circuit (MMIC) section, said MMIC section comprising:
      a first non-radiative dielectric (NRD) waveguide comprising a first dielectric strip line having a length direction, in combination with said first conductive plate and said second conductive plate; and
      an electrical element connected to said first non-radiative dielectric waveguide for generating a millimeter wave signal to be propagated therein; and
   c) a plane antenna section comprising:
      a slot antenna; and
      a second non-radiative dielectric (NRD) waveguide comprising a second dielectric strip line having a length direction, in combination with said first conductive plate, and said second conductive plate, wherein said second non-radiative dielectric waveguide is coupled in an electromagnetic coupling arrangement with said first non-radiative dielectric waveguide;

wherein said radiating system is disposed on a supporting portion of said vehicle, said supporting portion being made of a material that allows transmission of millimeter waves with a low loss;

wherein the plane antenna section has a deflecting portion for deflecting a leaking and radiating millimeter wave in a direction perpendicular to the length direction of said second non-radiative dielectric waveguide; and wherein said deflecting portion has a saw-tooth surface on a side thereof facing said second NRD waveguide and has a substantially flat surface on a side thereof facing away from said second NRD waveguide.

2. The radiating system as claimed in claim 1, wherein said supporting portion of said vehicle is a license plate.

3. The radiating system as claimed in claim 2, wherein said radiating system is disposed on a back of said license plate.

4. The radiating system as claimed in claim 2, wherein said radiating system is disposed inside of said license plate.

5. The radiating system as claimed in claim 1, wherein said supporting portion of said vehicle is a flat-shaped identifying device disposed on or inside said vehicle.

6. The radiating system as claimed in claim 1, further comprising
a partition conductor which separates said plane antenna section from said MMIC section.

7. The radiating system as claimed in claim 6, wherein said supporting portion of said vehicle is a license plate.

8. The radiating system as claimed in claim 7, wherein said radiating system is disposed on a back of said license plate.

9. The radiating system as claimed in claim 7, wherein said radiating system is disposed inside of said license plate.

10. A radiating system as claimed in claim 1, wherein said plane antenna section further comprises an additional NRD waveguide which is substantially perpendicular to and electromagnetically coupled with said second NRD waveguide.

11. A radiating system as claimed in claim 10, wherein said slot antenna is formed in said second conductive plate and comprises at least a pair of slot portions, one said slot portion being substantially parallel with said second NRD waveguide and another said slot portion being substantially parallel with said additional NRD waveguide.

12. A radiating system as claimed in claim 11, wherein millimeter waves propagated in said second NRD waveguide and millimeter waves propagated in said additional NRD waveguide have a 90° phase difference.

13. A radiating system as claimed in claim 10, wherein said slot antenna is formed in said second conductive plate and comprises a first plurality of slot portions which are substantially parallel with said second NRD waveguide and a second plurality of slot portions which are substantially parallel with said additional NRD waveguide.

14. A radiating system as claimed in claim 13, wherein said first and second pluralities of slot portions are interconnected with each other in a lattice arrangement.

15. A radiating system as claimed in claim 14, wherein millimeter waves propagated in said second NRD waveguide and millimeter waves propagated in said additional NRD waveguide have a 90° phase difference.

16. A radiating system as claimed in claim 13, wherein millimeter waves propagated in said second NRD waveguide and millimeter waves propagated in said additional NRD waveguide have a 90° phase difference.

17. The radiating system as claimed in claim 1, wherein said slot antenna is formed in said second conductive plate.

18. A radiating system as claimed in claim 1, wherein said MMIC section is formed on a first portion of said first conductive plate such that said MMIC section faces said second conductive plate.

19. A radiating system for a vehicle comprising:
a) a first conductive plate and a second conductive plate arranged substantially parallel to each other at a predetermined distance;
b) a millimeter wave integrated circuit (MMIC) section, said MMIC section comprising:
a first non-radiative dielectric (NRD) waveguide comprising a first dielectric strip line having a length direction, in combination with said first conductive plate and said second conductive plate; and
an electrical element connected to said first non-radiative dielectric waveguide for generating a millimeter wave signal to be propagated therein; and
c) a plane antenna section comprising:
a slot antenna; and
a second non-radiative dielectric (NRD) waveguide comprising a second dielectric strip line having a length direction, in combination with said first conductive plate, and said second conductive plate,
wherein said second non-radiative dielectric waveguide is coupled in an electromagnetic coupling arrangement with said first non-radiative dielectric waveguide;
wherein one of the conductive plates of the plane antenna section has a step which contributes to leaking and radiation of said millimeter wave signal from said second NRD waveguide, said step being spaced away from and substantially parallel to said second NRD waveguide;
wherein said radiating system is disposed on a supporting portion of said vehicle, said supporting portion being made of a material that allows transmission of millimeter waves with a low loss;
wherein the plane antenna section has a deflecting portion for deflecting a leaking and radiating millimeter wave in a direction perpendicular to the length direction of said second non-radiative dielectric waveguide; and
wherein said deflecting portion has a saw-tooth surface on a side thereof facing said second NRD waveguide and has a substantially flat surface on a side thereof facing away from said second NRD waveguide.

20. The radiating system as claimed in claim 19, wherein said slot antenna is formed in said second conductive plate.

21. A radiating system as claimed in claim 19, wherein said MMIC section is formed on a first portion of said first conductive plate such that said MMIC section faces said second conductive plate.

22. The radiating system as claimed in claim 19, wherein said supporting portion of said vehicle is a license plate.

23. The radiating system as claimed in claim 22, wherein said radiating system is disposed on a back of said license plate.

24. The radiating system as claimed in claim 22, wherein said radiating system is disposed inside of said license plate.

25. The radiating system as claimed in claim 19, wherein said supporting portion of said vehicle is a flat-shaped identifying device disposed on or inside said vehicle.

26. The radiating system as claimed in claim 19, further comprising:
a partition conductor which separates said plane antenna section from said MMIC section.

27. The radiating system as claimed in claim 26, wherein said supporting portion of said vehicle is a license plate.

28. The radiating system as claimed in claim 27, wherein said radiating system is disposed on a back of said license plate.

29. The radiating system as claimed in claim 27, wherein said radiating system is disposed inside of said license plate.

30. A radiating system as claimed in claim 19, wherein said plane antenna section further comprises an additional NRD waveguide which is substantially perpendicular to and electromagnetically coupled with said second NRD waveguide.

31. A radiating system as claimed in claim 30, wherein said slot antenna is formed in said second conductive plate and comprises at least a pair of slot portions, one said slot portion being substantially parallel with said second NRD waveguide and another said slot portion being substantially parallel with said additional NRD waveguide.

32. A radiating system as claimed in claim 31, wherein millimeter waves propagated in said second NRD waveguide and millimeter waves propagated in said additional NRD waveguide have a 90° phase difference.

33. A radiating system as claimed in claim 30, wherein said slot antenna is formed in said second conductive plate and comprises a first plurality of slot portions which are substantially parallel with said second NRD waveguide and a second plurality of slot portions which are substantially parallel with said additional NRD waveguide.

34. A radiating system as claimed in claim 33, wherein said first and second pluralities of slot portions are interconnected with each other in a lattice arrangement.

35. A radiating system as claimed in claim 34, wherein millimeter waves propagated in said second NRD waveguide and millimeter waves propagated in said additional NRD waveguide have a 90° phase difference.

36. A radiating system as claimed in claim 33, wherein millimeter waves propagated in said second NRD waveguide and millimeter waves propagated in said additional NRD waveguide have a 90° phase difference.

37. A radiating system for a vehicle comprising:
 a) a first conductive plate and a second conductive plate arranged substantially parallel to each other at a predetermined distance;
 b) a millimeter wave integrated circuit (MMIC) section, said MMIC section comprising:
   a first non-radiative dielectric (NRD) waveguide comprising a first dielectric strip line having a length direction, in combination with said first conductive plate and said second conductive plate; and
   an electrical element connected to said first non-radiative dielectric waveguide for generating a millimeter wave signal to be propagated therein; and
 c) a plane antenna section comprising:
   a slot antenna; and
   a second non-radiative dielectric (NRD) waveguide comprising a second dielectric strip line having a length direction, in combination with said first conductive plate, and said second conductive plate,
 wherein said second non-radiative dielectric waveguide is coupled in an electromagnetic coupling arrangement with said first non-radiative dielectric waveguide;
 wherein one of the conductive plates of the plane antenna section has a step which contributes to leaking and radiation of said millimeter wave signal from said second NRD waveguide, said step being substantially parallel to second NRD waveguide, and spaced away from said second NRD waveguide in a direction substantially parallel to said first and second conductive plates;
 wherein said radiating system is disposed on a supporting portion of said vehicle, said supporting portion being made of a material that allows transmission of millimeter waves with a low loss.

38. The radiating system as claimed in claim 37, wherein said slot antenna is formed in said second conductive plate.

39. A radiating system as claimed in claim 37, wherein said MMIC section is formed on a first portion of said first conductive plate such that said MMIC section faces said second conductive plate.

40. The radiating system as claimed in claim 37, wherein said supporting portion of said vehicle is a license plate.

41. The radiating system as claimed in claim 40, wherein said radiating system is disposed on a back of said license plate.

42. The radiating system as claimed in claim 40, wherein said radiating system is disposed inside of said license plate.

43. The radiating system as claimed in claim 37, wherein said supporting portion of said vehicle is a flat-shaped identifying device disposed on or inside said vehicle.

44. The radiating system as claimed in claim 37, further comprising:
 a partition conductor which separates said plane antenna section from said MMIC section.

45. The radiating system as claimed in claim 44, wherein said supporting portion of said vehicle is a license plate.

46. The radiating system as claimed in claim 45, wherein said radiating system is disposed on a back of said license plate.

47. The radiating system as claimed in claim 45, wherein said radiating system is disposed inside of said license plate.

48. The radiating system as claimed in claim 37, wherein the plane antenna section has a deflecting portion for deflecting a leaking and radiating millimeter wave in a direction perpendicular to the length direction of said second non-radiative dielectric waveguide.

49. A radiating system as claimed in claim 37, wherein said plane antenna section further comprises an additional NRD waveguide which is substantially perpendicular to and electromagnetically coupled with said second NRD waveguide.

50. A radiating system as claimed in claim 49, wherein said slot antenna is formed in said second conductive plate and comprises at least a pair of slot portions, one said slot portion being substantially parallel with said second NRD waveguide and another said slot portion being substantially parallel with said additional NRD waveguide.

51. A radiating system as claimed in claim 50, wherein millimeter waves propagated in said second NRD waveguide and millimeter waves propagated in said additional NRD waveguide have a 90° phase difference.

52. A radiating system as claimed in claim 49, wherein said slot antenna is formed in said second conductive plate and comprises a first plurality of slot portions which are substantially parallel with said second NRD waveguide and a second plurality of slot portions which are substantially parallel with said addition NRD waveguide.

53. A radiating system as claimed in claim 52, wherein said first and second pluralities of slot portions are interconnected with each other in a lattice arrangement.

54. A radiating system as claimed in claim 53, wherein millimeter waves propagated in said second NRD waveguide and millimeter waves propagated in said additional NRD waveguide have 90° phase difference.

55. A radiating system as claimed in claim 52, wherein millimeter waves propagated in said second NRD waveguide and millimeter waves propagated in said additional NRD waveguide have a 90° phase difference.

56. A radiating system for a vehicle comprising:
   a) a first conductive plate and a second conductive plate arranged substantially parallel to each other at a predetermined distance;
   b) a millimeter wave integrated circuit (MMIC) section, said MMIC section comprising:
      a first non-radiative dielectric (NRD) waveguide comprising a first dielectric strip line having a length direction, in combination with said first conductive plate and said second conductive plate; and
      an electrical element connected to said first non-radiative dielectric waveguide for generating a millimeter wave signal to be propagated therein; and
   c) a plane antenna section comprising:
      a slot antenna; and
      a second non-radiative dielectric (NRD) waveguide comprising a second dielectric strip line having a length direction, in combination with said first conductive plate, and said second conductive plate,
      wherein said second non-radiative dielectric waveguide is coupled in an electromagnetic coupling arrangement with said first non-radiative dielectric waveguide;
      wherein one of the conductive plates of the plane antenna sesction has a step which contributes to leaking and radiation of said millimeter wave signal from said second NRD waveguide, said step being substantially parallel to said second NRD waveguide, and spaced away from said second NRD waveguide in a direction substantially parallel to said first and second conductive plates;
      wherein said radiating system is disposed on a supporting portion of said vehicle, said supporting portion being made of a material that allows transmission of millimeter waves with a low loss;
      wherein the plane antenna section has a deflecting portion for deflecting a leaking and radiating millimeter wave in a direction perpendicular to the length direction of said second non-radiative dielectri waveguide; and
      wherein said deflecting portion has a saw-tooth surface on a side thereof facing said second NRD waveguide and has a substantially flat surface on a side thereof facing away from said second NRD waveguide.

* * * * *